(12) United States Patent
Naritomi et al.

(10) Patent No.: US 7,640,646 B2
(45) Date of Patent: Jan. 5, 2010

(54) METHOD FOR PRODUCING COMPOSITE OF ALUMINUM ALLOY AND THERMOPLASTIC RESIN

(75) Inventors: Masanori Naritomi, Tokyo (JP); Naoki Ando, Tokyo (JP); Masao Takahashi, Tokyo (JP); Masao Shiraishi, Tokyo (JP)

(73) Assignee: Taisei Plas Co., Ltd., Tokyo (JP)

( * ) Notice: Subject to any disclaimer, the term of this patent is extended or adjusted under 35 U.S.C. 154(b) by 0 days.

(21) Appl. No.: 12/010,472

(22) Filed: Jan. 25, 2008

(65) Prior Publication Data

US 2008/0127479 A1    Jun. 5, 2008

Related U.S. Application Data

(62) Division of application No. 10/250,678, filed as application No. PCT/JP02/07267 on Jul. 17, 2002.

(30) Foreign Application Priority Data

| Dec. 28, 2001 | (JP) | ............................. 2001-400986 |
| Dec. 28, 2001 | (JP) | ............................. 2001-400987 |

(51) Int. Cl.
  *B23P 25/00*   (2006.01)
(52) U.S. Cl. .................. 29/458; 29/527.1; 29/527.2
(58) Field of Classification Search .................... 29/458, 29/469.5, 527.1, 527.2
See application file for complete search history.

(56) References Cited

U.S. PATENT DOCUMENTS

| 3,531,332 | A | 9/1970 | Scott et. al. |
| 4,222,928 | A | 9/1980 | Kawamura et al. |
| 5,103,550 | A | 4/1992 | Wefers et al. |
| 5,395,733 | A | 3/1995 | Maemoto et al. |
| 5,753,377 | A | 5/1998 | Takahashi et al. |
| 6,238,783 | B1 | 5/2001 | Komai et al. |
| 6,475,597 | B2 | 11/2002 | Komai et al. |
| 7,010,121 | B2 * | 3/2006 | Wennemer et al. ..... 379/433.01 |

FOREIGN PATENT DOCUMENTS

| EP | 0882570 | 12/1998 |
| GB | 2326374 | 12/1998 |
| JP | 50-158539 A | 12/1975 |

(Continued)

*Primary Examiner*—Jermie E Cozart
(74) *Attorney, Agent, or Firm*—Westerman, Hattori, Daniels & Adrian, LLP

(57) ABSTRACT

The present invention is useful for achieving a reduction in weight and for attaining increased strength in not only electronic devices and domestic electric devices but also various parts and structures. As a pretreatment, a rib (3) is dipped in an aqueous solution of ammonia, hydrazine, a hydrazine derivative, or a water-soluble amine compound. A metal frame (2) is inserted into an injection mold for forming ribs (3) by injection molding. A thermoplastic resin composition is injected to the surface of the metal frame (2) by injection molding to form ribs (3). In the housing of a casing cover (1) thus formed, the metal frame (2) and the ribs (3) made of the thermoplastic resin composition are integrally bonded together. Thus, the housing improves strength and external appearance. Moreover, a complicated configuration and structure can be formed in the housing.

15 Claims, 2 Drawing Sheets

FOREIGN PATENT DOCUMENTS

| | | |
|---|---|---|
| JP | 54-13587 A | 2/1979 |
| JP | 54-13588 A | 2/1979 |
| JP | 58-217679 A | 12/1983 |
| JP | 5-70969 A | 3/1993 |
| JP | 10-77455 A | 3/1998 |
| JP | 2000-271975 | 10/2000 |
| JP | 2000-281946 A | 10/2000 |
| JP | 2001-225352 A | 8/2001 |
| JP | 2003-39491 | 2/2003 |
| WO | 97-35717 | 10/1997 |

* cited by examiner

METHOD FOR PRODUCING COMPOSITE OF ALUMINUM ALLOY AND THERMOPLASTIC RESIN

This application is a divisional of prior application Ser. No. 10/250,678 filed Jul. 16, 2003 which is still pending, which is a National Stage of International Application No. PCT/JP2002/07267 filed on Jul. 17, 2002.

TECHNICAL FIELD

The present invention relates to a composite of an aluminum alloy and a resin and also relates to a production method therefor. More particularly, the present invention relates to a structure having a thermoplastic resin integrated with a shaped aluminum alloy material produced by various machining methods. That is, the present invention relates to an aluminum alloy-and-resin composite for use in housings of electronic devices, housings of domestic electrification products, structural parts of automobiles and the like, mechanical parts of various structures, etc., and also relates to a production method therefor.

BACKGROUND ART

Techniques for integrating a metal and a resin with each other are demanded in a wide variety of fields such as those of manufacturing parts of automobiles, domestic electrification products, industrial equipment, etc. For this purpose, many adhesives have been developed. Among them are very excellent adhesives. Adhesives that exhibit their function at ordinary temperature or upon heating are used for bonding to integrate a metal and a synthetic resin with each other. The bonding method using such an adhesive is now a common technique.

Meanwhile, researches have heretofore been made to find an even more rational bonding method that does not use an adhesive. However, a method of integrating a high-strength engineering resin with light metals such as magnesium, aluminum and alloys thereof or iron alloys such as stainless steel without using an adhesive has not yet been put to practical use. Examples of such a method include a method wherein a resin component is bonded (fixed) to a metal by injection molding or other similar process. This method is defined and named by the present inventors as "injection bonding method" (it should be noted, however, that the term does not mean only a forming method effected by injection molding).

The present inventors conducted exhaustive studies and development and found that bond strength increases uniquely (in the present invention, the term "bond strength" is used as a synonym of "adhesive force") if a shaped aluminum alloy material is dipped in an aqueous solution of a water-soluble reducing agent and thereafter brought into contact with a thermoplastic resin composition consisting essentially of an alkylene terephthalate resin under high-temperature and high-pressure conditions. The present inventors proposed this finding as Japanese Patent Application Laid-open No. 2003-103563.

The present inventors noted aluminum alloy, in particular, among metal alloys for the reasons stated below. Aluminum is light in weight and abundant as a resource. Alloying or surface treatment allows aluminum to exhibit high strength, high corrosion resistance, free-cutting properties, high extensibility, etc. in addition to its inherent physical properties, i.e. excellent extensibility, electrical conductivity and thermal conductivity. Therefore, aluminum alloys are now used in a wide variety of fields. Particularly, it is expected that personal computerization will further progress and, consequently, mobile electronic devices will be used for general purposes in the future. Accordingly, it is expected that there will be an even stronger demand that these devices should be reduced in weight. In this regard, the utilization of aluminum alloys is expected to further increase.

The present inventors focused on aluminum alloy and a thermoplastic resin composition mainly containing polybutylene terephthalate (hereinafter referred to as "PBT"), among the above-described inventions made by the present inventors, and repeated experiments regarding the horizontal development relating to the above-described invention. The feature of the above-described invention resides in that an aluminum alloy is treated with an aqueous solution of a water-soluble reducing agent. It was, however, observed by surface analysis and so forth using X-ray photoelectron spectroscopy (XPS) that even if a reducing agent was used, when the aluminum alloy was taken out of the treating aqueous solution, the surface thereof was instantaneously oxidized by oxygen in the air and not in a zero-valence aluminum metal state in terms of the final surface condition.

Meanwhile, hydrazine used mainly in the above-described invention is not particularly dangerous. However, we also considered it to be important to find other effective chemicals for surface treatment. With these matters taken into consideration, we hypothesized about the injection bonding principle and performed demonstrative experiments. This was done because we considered it to be useful for developing a reliable injection bonding method.

The present inventors made efforts to expand the above-described invention achieved by us to develop a method capable of attaining the same purpose by treating the surface of an aluminum alloy without using a reducing agent such as hydrazine, sodium borohydride ($NaBH_4$), which is costly, or lithium aluminum hydride ($LiAlH_4$), which is difficult to handle.

There are various kinds of aluminum alloy improved in strength or other properties. There has also been a need of a pretreatment method capable of bonding a resin to an aluminum alloy containing magnesium, silicon, copper or other metal with satisfactory injection bond strength.

An object of the present invention is to obtain an aluminum alloy-and-resin composite wherein a thermoplastic resin composition and a shaped aluminum alloy material are made to adhere so strongly that they will not readily separate from each other by treating the aluminum alloy surface, and also obtain a production method therefor.

Another object of the present invention is to obtain an aluminum alloy-and-resin composite capable of making housings and parts of various devices, structures, etc. free from problems in terms of configuration, structure and mechanical strength, and also obtain a production method therefor.

Still another object of the present invention is to obtain an aluminum alloy-and-resin composite useful for reducing the weight of housings and parts of electronic devices, structures, etc. and for simplifying device manufacturing processes, and also obtain a production method therefor.

DISCLOSURE OF THE INVENTION

An aluminum alloy-and-resin composite according to the present invention is characterized by comprising a shaped aluminum alloy material that has been subjected to a contact process in which it is brought into contact with at least one compound selected from the group consisting of ammonia, hydrazine, a hydrazine derivative, and a water-soluble amine compound; and a resin material integrally bonded to the surface of the shaped aluminum alloy material, the resin material being at least one selected from the group consisting of a polyalkylene terephthalate, a copolymer consisting essentially of the polyalkylene terephthalate, and a thermoplastic resin composition containing the polyalkylene terephthalate as a component.

A method of producing a composite of an aluminum alloy and a resin according to the present invention is characterized by comprising a processing step of forming the aluminum alloy into a shaped aluminum alloy material by machining; a contact step of bringing the shaped aluminum alloy material into contact with at least one compound selected from the group consisting of ammonia, hydrazine, a hydrazine derivative, and a water-soluble amine compound; and a forming step of inserting the shaped aluminum alloy material, which has been contact-treated in the contact step, into a mold for forming process, and integrating a resin material to the surface of the shaped aluminum alloy material under pressure and heating, the resin material being at least one selected from the group consisting of a polyalkylene terephthalate, a copolymer consisting essentially of the polyalkylene terephthalate, and a thermoplastic resin composition containing the polyalkylene terephthalate as a component.

The production of an aluminum alloy-and-resin composite according to the present invention will be described below in detail for each constituent element.

[Shaped Aluminum Alloy Material]

As a constituent material of the shaped aluminum alloy material, it is possible to use various aluminum alloys such as those standardized as "1000 series" to "7000 series" by JIS (Japanese Industrial Standards) and those for die casting. Among these aluminum alloys, "1000 series" are alloys of high-purity aluminum. The others are alloys containing magnesium, silicon, copper, manganese, etc. in addition to aluminum according to a wide variety of purposes. As a pretreatment process for the surface of the shaped aluminum alloy material, "Pretreatment Process I", which will be described later, is a preferable method for an alloy containing a relatively large amount of a metal other than aluminum. However, this pretreatment process is not always needed. Anyway, it is possible to use not only high-purity aluminum alloys but also many of aluminum alloys actually used for housings of various devices and so forth at present.

In the case of bonding a resin by injection molding, the shaped aluminum alloy material is formed into a desired configuration from an aluminum alloy ingot, plate, bar or the like by machining, e.g. plastic working, sawing, milling, electrical discharge machining, drilling, press working, grinding, or polishing, which may be used singly or in combination. By this machining process, the aluminum alloy is formed into a shaped aluminum alloy material with a configuration and structure necessary for use as an insert in the injection molding process. The shaped aluminum alloy material processed in this way requires that the surface thereof that is to be bonded should be free from a thick coating, e.g. rust formed by oxidation or hydroxidation. When it is clear that rust is present on the surface of the shaped aluminum alloy material as a result of it having been allowed to stand for a long period of time, the rust needs to be removed by polishing.

(i) Surface Processing

Surface processing may be effected by polishing. However, it is preferable to carry out surface processing to remove a coating layer, e.g. rust, from the surface by machining, e.g. sandblasting, shot blasting, grinding, or barreling, immediately before the pretreatment process using an aqueous solution, which will be described below. It is preferable that the surface of the shaped aluminum alloy material that is to be bonded (fixed) to a thermoplastic resin composition (described later) should be roughened, i.e. increased in surface roughness, by the above-described surface processing to enhance the bond effect between the surface and the thermoplastic resin composition.

In addition, the surface processing plays important roles, such as removing an oil or fat layer left on the surface after the metal working process and peeling off an oxide layer, a corrosion product layer, etc. grown on the surface during the storage of the shaped aluminum alloy material after the machining process, thereby renewing the aluminum alloy surface. Thus, the effect of the subsequent process can be made to act uniformly over the renewed surface. Experiments conducted by the present inventors confirm that the surface condition of the blasted shaped aluminum alloy material stored for a period of time less than about one week under dry air conditions does not differ much from the surface treated by the subsequent process on the same day.

(ii) Cleaning Process

The cleaning process is not always necessary for the present invention because the above-described surface processing is carried out. However, fats and oils or fine dust particles may be attached to the surface of the shaped aluminum alloy material. The surface treated by machining process, in particular, may be stained with a coolant used during the machining process, together with cuttings and so forth. Therefore, it is preferable to wash them off. It is preferable to perform washing with an organic solvent and rinsing with water in combination, although it depends on the kind of contamination. If a water-soluble organic solvent, e.g. acetone, methanol, or ethanol, is used, it is easy to remove the organic solvent by rinsing with water after the shaped aluminum alloy material has been dipped in the organic solvent to remove oily contamination. If oily matter is firmly attached to the surface, it may be washed with an organic solvent, e.g. benzine, or xylene.

In this case also, it is preferable to carry out rinsing with water after washing and then perform drying. The storage period of time after the cleaning process should also be shortened as much as possible. It is preferable that the cleaning process and the following process (pretreatment process) should be continuously carried out without interruption, if possible. In a case where these processes are carried out continuously, it is unnecessary to perform drying after the cleaning process.

[Pretreatment Process I]

(i) Alkali Etching

If the following pretreatment process I is carried out as a pretreatment for the contact process (described later), it is possible to provide even more effective bonding between the shaped aluminum alloy material and the thermoplastic resin composition. This is a treatment for forming the aluminum alloy surface into a finely etched surface. The shaped aluminum alloy material is dipped in a basic aqueous solution (pH>7) first, and then it is rinsed with water. Examples of bases usable in the basic aqueous solution are alkali metal hydroxides, such as sodium hydroxide (NaOH) and potassium hydroxide (KOH), soda ash ($Na_2CO_3$; anhydrous sodium carbonate), which is a low-cost material containing an alkali metal hydroxide, and ammonia.

Alkali earth metal hydroxides (Ca, Sr, Ba, Ra) are also usable. From the practical point of view, however, a base should be selected from the former group of materials, which are less costly and yet effective. When sodium hydroxide is used, it is preferable to prepare an aqueous solution containing a sodium hydroxide concentration of 0.1 to 10%. In the case of using soda ash, it is also preferable to prepare an aqueous solution containing a soda ash concentration of 0.1 to 10%. The dipping time is several minutes at ordinary temperature. After the dipping treatment, rinsing with water is performed. Dipping in the basic aqueous solution allows the aluminum alloy surface to dissolve into aluminate ions while releasing hydrogen. As a result, the aluminum alloy surface becomes a finely etched surface.

(ii) Neutralization Treatment

Next, the shaped aluminum alloy material is dipped in an acid aqueous solution, followed by rinsing with water. The purpose of using an acid aqueous solution is to effect neutralization. If sodium hydroxide or the like is left unremoved from the surface of the shaped aluminum alloy material in the previous process, it is expected that the remaining sodium hydroxide will accelerate corrosion of the shaped aluminum alloy material when used as a product. Therefore, neutralization is necessary. In addition, metals forming a solid solution with the aluminum alloy, e.g. magnesium, copper, and silicon, are not completely dissolved by the pretreatment process using a basic aqueous solution but remain in the form of hydroxides or other compositions in the vicinity of the surface. These substances can also be removed by dipping in the acid aqueous solution.

Accordingly, any acid aqueous solution conformable to the above-described purpose is usable. More specifically, dilute nitric acid is preferable. For an aluminum alloy containing silicon, it is also preferable to add hydrofluoric acid for the purpose of silicon oxide measures. It is preferable that the concentration of nitric acid ($HNO_3$) should be of the order of several percent, and the concentration of hydrofluoric acid (aqueous solution of liquid hydrogen fluoride) should be from 0 to 1.0%. If the concentration of nitric acid is high, the surface of aluminum alloy becomes close to being anodized aluminum, which is likely to cause a problem in the subsequent process.

A dipping time of several minutes is sufficient for this process. In a case where the surface is stained with something like lye (consisting essentially of hydroxides of metals added to aluminum or silicon oxide), it may be judged that this pretreatment process should be terminated when the lye-like substance has dissolved or peeled off the surface. Next, the shaped aluminum alloy material is pulled out of the acid aqueous solution and then rinsed with water.

It should be noted that the neutralization treatment is not always necessary to carry out. It was possible to obtain practically sufficient bond strength between the shaped aluminum alloy material and the thermoplastic resin composition even when the neutralization treatment was not carried out.

[Pretreatment Process II]

The following pretreatment process II may be performed in place of the above-described pretreatment process I. The pretreatment process II provides effective bonding between the shaped aluminum alloy material and the thermoplastic resin composition. The shaped aluminum alloy material is dipped in an aqueous solution of a water-soluble reducing agent first, and then it is rinsed with water. Examples of water-soluble reducing agents usable are alkali-metal sulfites, alkali-metal hydrogensulfites, hydrazine ($N_2H_4$), alkali-metal borohydrides (e.g. sodium borohydride ($NaBH_4$)), and alkali-metal aluminum hydrides (e.g. lithium aluminum hydride ($LiAlH_4$)). Among them, sodium sulfite is particularly preferable to use. When a sodium sulfite aqueous solution is used, the concentration is of the order of 1 to 5%, and the dipping time is from several minutes to 10 minutes at ordinary temperature.

[Contact Treatment Process]

Upon completion of the above-described pretreatment process I or II, the shaped aluminum alloy material is treated by the following contact treatment process (i) or (ii).

(i) Aqueous Solution Dipping Process

As a contact treatment method for the surface of the shaped aluminum alloy material, there is an aqueous solution dipping process in which the shaped aluminum alloy material is dipped in an aqueous solution of a compound as stated below. The shaped aluminum alloy material is dipped in an aqueous solution of at least one selected from the group consisting of ammonia ($NH_3$), hydrazine ($N_2H_4$), a hydrazine derivative, and a water-soluble amine compound. For an aqueous solution of ammonia, commercially available aqueous ammonia is usable as it is or in the form of a dilute solution. When hydrazine is used, commercially available hydrazine hydrate or 60% hydrazine aqueous solution is usable as a raw material for a dilute solution. It is also possible to use an aqueous solution of a hydrazine derivative, e.g. an aqueous solution of carbodihydrazide ($NH_2$—NH—CO—NH—$NH_2$).

As a water-soluble amine compound, lower amines are usable. Particularly preferable lower amines are methylamine ($CH_3NH_2$), dimethylamine (($CH_3)_2NH$), trimethylamine (($CH_3)_3N$), ethylamine ($C_2H_5NH_2$), diethylamine (($C_2H_5)_2NH$), triethylamine (($C_2H_5)_3N$), ethylene diamine ($H_2NCH_2CH_2NH_2$), ethanol amine (mono-ethanol amine ($HOCH_2CH_2NH_2$), aryl amine ($CH_2CHCH_2NH_2$), diethanol amine (($HOCH_2CH_2)_2NH$), etc. These compounds are dissolved in water when used.

The concentration of the above-described compound in an aqueous solution to be used is of the order of 2 to 30%. The dipping time is from several minutes to 30 minutes at a temperature in the range of from ordinary temperature to 60° C. If ammonia is used, for example, it is preferable to perform dipping in the aqueous solution containing an ammonia concentration of 10 to 30% for 15 to 120 minutes under ordinary temperature conditions. After being dipped in an aqueous solution of at least one of the above-mentioned compounds, the shaped aluminum alloy material is rinsed with water and then dried.

When the aluminum alloy is dipped in the aqueous ammonia solution, aluminum in the alloy dissolves into aluminate ions while releasing hydrogen bubbles. As a result, the aluminum alloy surface becomes a finely etched surface. After the aluminum alloy has been dipped in the aqueous ammonia solution, followed by rinsing with water and drying, the surface thereof was analyzed by the X-ray photoelectron spectroscopy (XPS). The analysis revealed that nitrogen remained on the aluminum alloy surface. It is presumed that the nitrogen remaining on the aluminum alloy surface is effective in bonding by the injection molding.

(ii) Gas Contact Process

As a contact treatment method for the surface of the shaped aluminum alloy material, there is a gas contact process in which the aluminum alloy surface is brought into contact with a gas produced by gasifying at least one of compounds mentioned below. With this gas contact process, it is preferable that the shaped aluminum alloy material that has been subjected to the pretreatment process I should be treated with the compound gas from the viewpoint of ensuring the adhesive strength between the shaped aluminum alloy material and the thermoplastic resin composition.

The shaped aluminum alloy material is brought into contact with at least one compound selected from the group consisting of ammonia ($NH_3$), hydrazine ($N_2H_4$), pyridine ($C_5H_5N$), and an amine compound. The purpose of this process is to adsorb such a nitrogen-containing compound on the shaped aluminum alloy material prepared in the previous process. Preferable nitrogen-containing compounds are those which may be regarded as amine compounds in a broad sense, such as ammonia, hydrazine, pyridine, methylamine ($CH_3NH_2$), dimethylamine (($CH_3)_2NH$), trimethylamine (($CH_3)_3N$), ethylamine ($C_2H_5NH_2$), diethylamine (($C_2H_5)_2NH$), triethylamine (($C_2H_5)_3N$), ethylene diamine ($H_2NCH_2CH_2NH_2$), ethanol amine (mono-ethanol amine ($HOCH_2CH_2NH_2$), aryl amine ($CH_2CHCH_2NH_2$), diethanol amine (($HOCH_2CH_2)_2NH$), triethanol amine (($HOCH_2CH_2)_3 N$), aniline ($C_6H_7N$), and other amines.

Ammonia or a lower amine having a high vapor pressure allows this process to proceed by allowing the shaped aluminum alloy material to pass through (contact) the gas thereof. In the case of hydrazine or a lower amine compound having a low vapor pressure, it is dissolved in water, and the shaped aluminum alloy material is dipped in the aqueous solution. Alternatively, the shaped aluminum alloy material may be dipped directly in hydrazine or such a lower amine compound without dilution. It is also possible to complete the contact process by spraying the shaped aluminum alloy material with an aqueous solution of such a compound.

In a case where the shaped aluminum alloy material is brought into contact with a gas, e.g. ammonia, a commercially available ammonia gas cylinder may be used. It is also possible to use a method wherein the shaped aluminum alloy material is passed through a gas phase part in a container half-filled with commercially available aqueous ammonia. A lower amine or the like makes it possible to bring the aluminum alloy into contact with the vapor thereof by heating an aqueous solution thereof slightly. Hydrazine and ethanol amines are suitable for use in the form of an aqueous solution. Lower amines are usable in either an aqueous solution or a toluene solution. Dipping the shaped aluminum alloy material directly in liquefied ammonia or pyridine is also effective. However, the former requires large-scale industrial equipment, and the latter involves troublesome processing of pyridine after the treatment. Therefore, these are not practical.

Any of nitrogen-containing compounds belonging to amines in a broad sense, which are used in this process, gives off an offensive smell. In this regard, it is most preferable to handle them in a dilute solution. However, if the process is arranged to make contact with ammonia gas at ordinary pressure, equipment for the process may not become so complicated. Regarding processing conditions where the shaped aluminum alloy material is exposed to ammonia gas at ordinary pressure, it is preferable to put it in the gas for from several tens of minutes to several days at ordinary temperature. It should be noted, however, that lower amines, hydrazine, aniline and pyridine are preferable to use in an aqueous solution for dipping.

(iii) Storage of Shaped Aluminum Alloy Material after Pretreatment

The shaped aluminum alloy material after drying is stored under dry air conditions. The storage period of time should preferably be shortened as much as possible. However, there will be no problem, provided that the storage time is within one week at ordinary temperature.

[Thermoplastic Resin Composition]

The following is a description of the thermoplastic resin composition that is bonded to the shaped aluminum alloy material in the present invention. The thermoplastic resin composition comprises at least one resin material selected from the group consisting of a polyalkylene terephthalate, a copolymer consisting essentially of a polyalkylene terephthalate, and a thermoplastic resin composition containing a polyalkylene terephthalate as a component. The resin material is bonded to the surface of the shaped aluminum alloy material. As the polyalkylene terephthalate, polybutylene terephthalate (PBT) is preferable.

As a polymer containing PBT, it is preferable to use at least one selected from the group consisting of a polymer consisting singly of PBT, a polymer compound of PBT and polycarbonate (hereinafter referred to as "PC"), a polymer compound of PBT and acrylonitrile-butadiene-styrene resin (hereinafter referred to as "ABS"), a polymer compound of PBT and polyethylene terephthalate (hereinafter referred to as "PET"), and a polymer compound of PBT and polystyrene (hereinafter referred to as "PS").

These polymers may contain a filler to improve mechanical characteristics. It is very important for the polymers to contain a filler from the viewpoint of obtaining coincidence in the coefficient of linear expansion between the shaped aluminum alloy material and the thermoplastic resin composition. Examples of preferable fillers are glass fiber, carbon fiber, aramid fiber, and other high-strength fibers similar to these.

It is preferable that a filler should be added to the above-described polymer compounds for the purpose of improving physical properties. The filler preferably comprises at least one selected from publicly known materials such as carbon black, calcium carbonate, calcium silicate, magnesium carbonate, silica, talc, clay, lignin, asbestos, mica, silica powder, and glass globules.

Even when the polymer compound does not contain the above-described filler, the resin molded material bonds to the metal to such an extent that very strong force is needed to remove the bonded resin molded material. However, when molded composites are subjected to a temperature cycle test, a series of thermoplastic resin compositions not containing the above-described filler rapidly degrades in bond strength as the number of cycles increases. Two causes are presumed regarding the reduction in bond strength.

One of the causes is that there is a large difference in the coefficient of linear expansion between the shaped aluminum alloy material and the thermoplastic resin composition. Pure aluminum has a relatively large coefficient of linear expansion among metals. Nevertheless, the linear expansion coefficient of pure aluminum is much smaller than that of the thermoplastic resin composition. The presence of the filler reduces the linear expansion coefficient of the thermoplastic resin composition and makes it close to the linear expansion coefficient of the aluminum alloy ($2.4 \times 10^{-5}$ in the case of pure aluminum). The linear expansion coefficient of the thermoplastic resin composition can be made fairly close to that of the aluminum alloy by appropriately selecting the kind of filler and the content thereof.

The other cause is the relationship between the cooling shrinkage of the shaped aluminum alloy material and the molding shrinkage of the thermoplastic resin composition after the insert molding process. The degree of molding shrinkage of a thermoplastic resin composition not containing a filler is of the order of 0.6% at minimum. On the other hand, the cooling shrinkage of the aluminum alloy is about 0.3% on the assumption that it cools down by about 150° C. to room temperature after the injection of the thermoplastic resin composition, for example. Thus, the cooling shrinkage of the aluminum alloy is smaller than the molding shrinkage of the thermoplastic resin composition. That is, there is a difference in the degree of shrinkage therebetween. As time passes after the release from the injection mold and hence the thermoplastic resin composition becomes stabilized, internal strain occurs at the interface. Consequently, only a slight impact may cause interfacial fracture, resulting in undesired separation of the thermoplastic resin composition.

This phenomenon will be described below more specifically. Regarding the aluminum alloy, the coefficient of thermal expansion, more specifically, the coefficient of linear expansion with respect to temperature change, is 2 to $3\times10^{-5 \circ}$ $C.^{-1}$. On the other hand, the linear expansion coefficient of PBT or a polymer compound containing PBT is 7 to $8\times10^{-5 \circ}$ $C.^{-1}$. To reduce the linear expansion coefficient, it is preferable that the filler content in the thermoplastic resin composition should be high, i.e. 20% or more, more preferably 30% or more. If PBT or a polymer compound containing PBT is allowed to contain 30 to 50% high-strength fiber or inorganic filler, the linear expansion coefficient becomes 2 to $3\times10^{-5 \circ}$ $C.^{-1}$, which is substantially coincident with that of aluminum.

At this time, the degree of molding shrinkage also reduces. Regarding the molding shrinkage, the high crystallizability of PBT raises the degree of shrinkage. Therefore, mixing the polymer with PET, PC, ABS, PS or other resin of low crystallizability to form a polymer compound allows the molding shrinkage to be further reduced. However, the PBT concentration is also reduced by adding such a resin material. We have not yet examined in detail about an optimum content of such a materiel.

[Forming Process/Injection Molding]

This process is carried out by the following method. An injection mold is prepared. The mold is opened, and the shaped aluminum alloy material is inserted into one of the mold parts. Then, the mold is closed, and the above-described thermoplastic resin composition is injected. Then, the mold is opened, and the molded product is released. This is the most excellent forming method in terms of the freedom of configuration, productivity, etc. For mass production, a robot should preferably be prepared for the insert loading operation.

Next, injection conditions will be described. Regarding the mold temperature and the injection temperature, the higher the temperature, the better results can be obtained. However, it is not necessary to increase the temperature excessively. A satisfactory bonding effect can be exhibited under injection conditions substantially similar to those for the ordinary injection molding using the above-described thermoplastic resin composition. From the viewpoint of increasing bond strength, it is preferable to pay attention to using pin gates as many as possible in the gate structure of the mold. At the pin gates, the resin temperature increases instantaneously by shear friction occurring when the resin passes therethrough. This often produces a favorable effect. In short, it seems preferable to contrive so that a high-temperature resin melt contacts the joint surface as much as possible without obstructing smooth molding.

[Forming Process/Method Other than Injection Molding]

An integrated article can be obtained by a forming method in which both the shaped aluminum alloy material and a thin shaped resin material made of a thermoplastic resin composition are inserted into one mold member and pressed with the other mold member upon heating, i.e. by a heat pressing process. This method is not suitable for mass production but possible to use, depending on the desired configuration of the integrated article. The principle of bonding is the same as the bonding by the above-described injection molding.

As another method, an extrusion process may be used when an integrated article such as a pipe-shaped article or a plate-shaped article is demanded. The extrusion process is also usable for the present invention. It is only important that the above-described thermoplastic resin composition should contact the treated surface of the shaped aluminum alloy material when the resin composition is in a hot melt state. The present invention can use any forming method in theory. With the extrusion process, however, the pressure applied between the molten resin and the surface of the shaped aluminum alloy material is markedly low in comparison to the injection molding or the like. In this regard, the extrusion process cannot be expected to exhibit the highest bond strength. However, there must be a design sufficiently usable in relation to practicality.

BEST MODE FOR CARRYING OUT THE INVENTION

Figure 1:
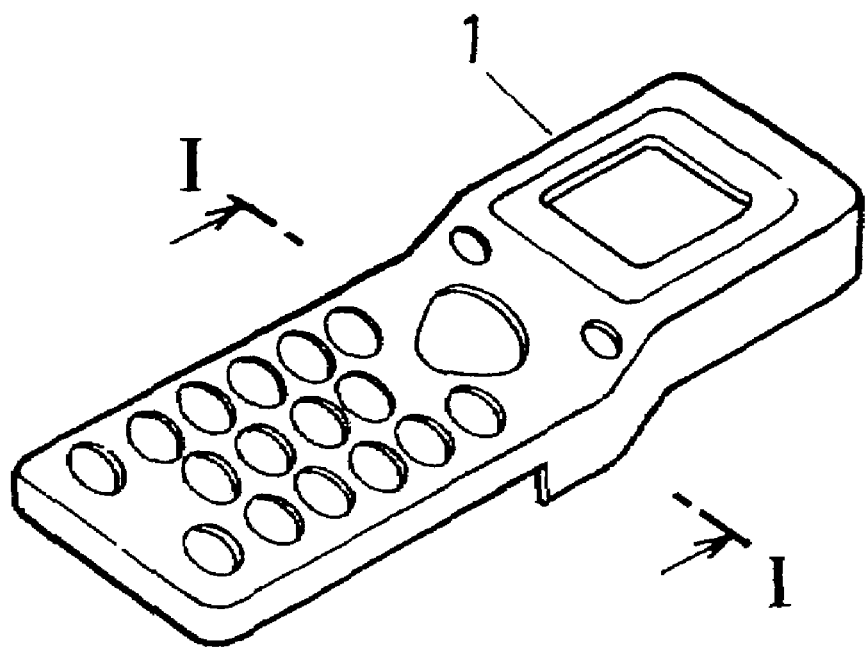
FIG. 1 is an external view of a mobile phone casing cover.
Figure 2:
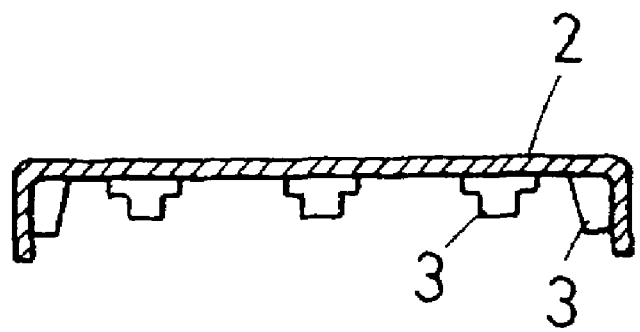
FIG. 2 is a sectional view of the mobile phone casing cover as taken along the line I-I in FIG. 1.

FIG. 1 is an external view of a mobile phone casing cover. FIG. 2 is a sectional view of the mobile phone casing cover as taken along the line I-I in FIG. 1. A casing cover 1 comprises a metal frame 2 formed from a plate material of an aluminum alloy by machining. More specifically, the metal frame 2 is formed by plastically working an aluminum alloy plate material with a press machine and a die driven thereby. If necessary, the plate material is further subjected to cutting process.

The metal frame 2 has ribs 3 integrally bonded to the inner surface thereof to form partitions and provide reinforcement. The ribs 3 are made of a thermoplastic resin composition. The ribs 3 are injection-molded by a method described below so as to be integrally bonded to the metal frame 2. The thermoplastic resin composition used for the injection process is such as those mentioned above. Before the injection molding of the ribs 3, the surface of the metal frame 2 is dip-treated with an aqueous solution of various compounds as mentioned above. Alternatively, the surface of the metal frame 2 is subjected to contact treatment with a gasified compound.

Figure 3:
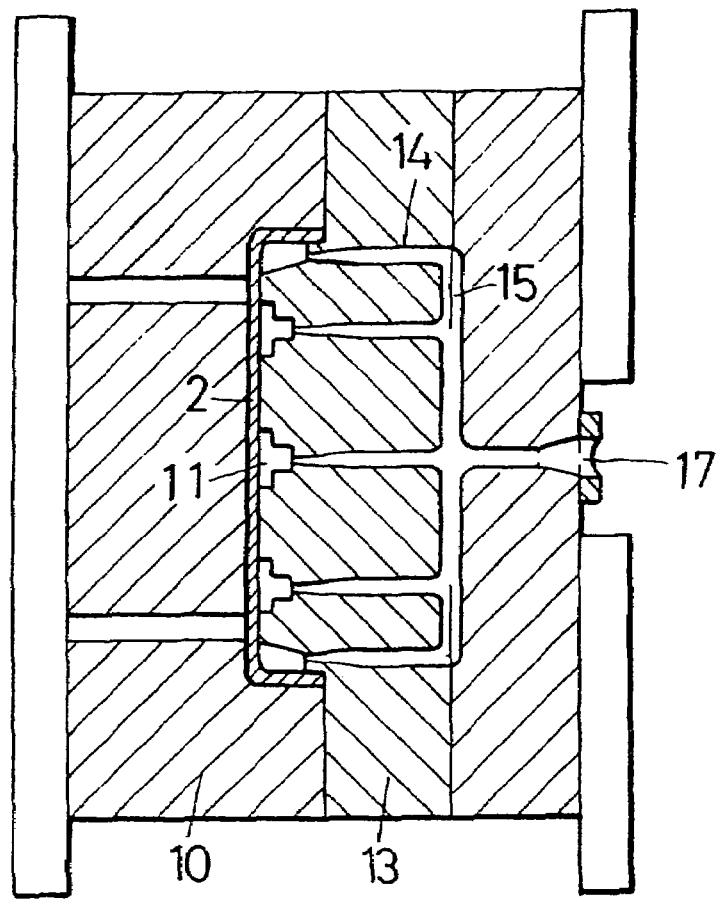
FIG. 3 is a sectional view of an injection mold in which a thermoplastic resin composition is injected to the surface of a metal frame by injection molding.

A method of bonding the ribs 3 by injection molding process (injection bonding) will be described below in detail. The above-described metal frame 2 after the surface treatment by dipping is taken out within as a short period of time as possible, i.e. within one week after the beginning of storage, and inserted into a mold for forming ribs 3 by injection molding. FIG. 3 is a sectional view of the injection mold in which a thermoplastic resin composition is injected to the surface of the metal frame 2 by injection molding. The pretreated metal frame 2 is inserted in the cavity of a movable retainer plate 10.

With the metal frame 2 inserted in the cavity, the movable retainer plate 10 is closed. The cavity 11 is a space formed between the metal frame 2, the movable retainer plate 10 and a stationary retainer plate 13 when the movable retainer plate 10 and the stationary retainer plate 13 are closed to each other. The cavity 11 is supplied with a molten resin for forming ribs 3 through a runner 15 and gates 14. Thus, the ribs 3 are molded. In the completed housing of the casing cover 1, the metal frame 2 and the ribs 3 made of a thermoplastic resin composition are integrally bonded together. Thus, the housing can make use of the characteristic features of the metal in terms of strength and design of external appearance. Moreover, a complicated configuration and structure can be formed in the housing.

EXPERIMENTAL EXAMPLES

The following simple experiments were carried out to experimentally confirm the embodiments of the present invention.

(i) Experimental Example 1

Dipping into Aqueous Solution

A commercially available aluminum alloy plate A1100 (Japanese Industrial Standards (JIS)) with a thickness of 1 mm was purchased. The aluminum alloy plate was cut into 100 rectangular pieces of 20 mm by 50 mm. The aluminum pieces were stuck to a rubber sheet with a double-sided adhesive tape, and this was put in a blast apparatus (not shown). The aluminum pieces were subjected to an air blast treatment with the air pulse duration set so that the stock removal was at a level of about 5μ. Then, the aluminum pieces were taken out of the blast apparatus and allowed to stand for within 5 hours on the average. Thereafter, the aluminum pieces were dipped for 10 minutes in 4 liters of ethanol while being subjected to ultrasonic waves. Thereafter, the aluminum pieces were dipped in 4 liters of ion-exchanged water under stirring. Then, the aluminum pieces were put into a plastic basket and further washed with 2 liters of ion-exchanged water, followed by drying with high-pressure air.

Next, 0.5 liter of a 28% ammonia aqueous solution was prepared in a polyethylene beaker, and the aluminum pieces were dipped therein. After 25 minutes, the aluminum pieces were pulled out of the solution and thoroughly washed with ion-exchanged water. Further, the aluminum pieces was dipped for several seconds in acetone filled in a beaker. Thereafter, the aluminum pieces were dried with a high-pressure air blast and then put in a storage box filled with dry air.

After two days, the aluminum pieces were taken out of the storage box and each inserted into an injection mold by being picked up with a gloved hand so that oil or other contaminant would not be attached thereto. After the mold had been closed, a PBT/PET resin (about 79% PBT and about 30% PET; available from Mitsubishi Rayon Co., Ltd.) containing 20% glass fiber and 20% micronized talc was injected to obtain an integrated composite as shown in FIG. 4.

Figure 4:
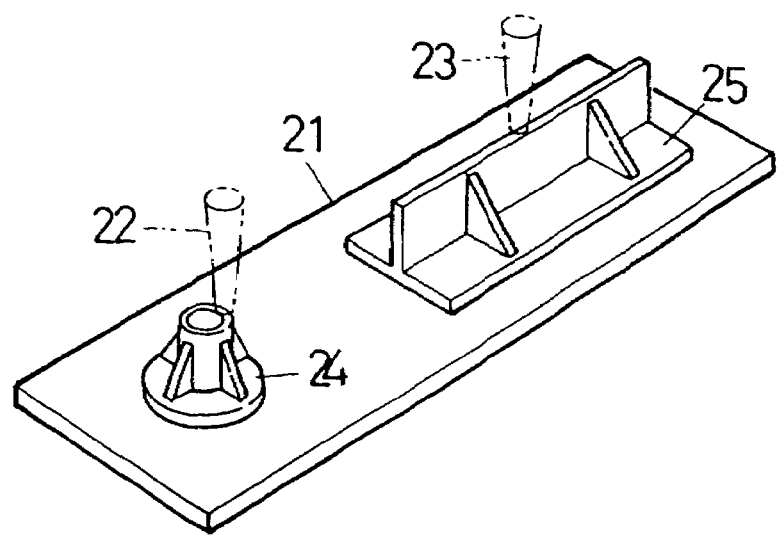
FIG. 4 shows an experimental piece of a composite of an aluminum alloy and a resin.

A rectangular base shown in FIG. 4 is a plate-shaped metal piece 21. The metal piece 21 has the same thickness of 1 mm and the same rectangular configuration of 20 mm by 50 mm as the aluminum pieces obtained as stated above. With respect to the metal piece 21, a resin composition is injected from two pin gates 22 and 23 to form a boss-shaped molding 24 and a rib-shaped molding 25. The boss-shaped molding 24 has a circular bonded surface with a diameter of 8 mm. The rib-shaped molding 25 has a rectangular bonded surface of 8 mm by 25 mm. Both the boss-shaped molding 24 and the rib-shaped molding 25 have a height of 8 mm. The boss-shaped molding 24 has a hole with a diameter of 2 mm in the center thereof so that a threaded measuring end for torque measurement can be screwed into the hole.

The mold temperature was set at 100° C. The terminal portion temperature and the nozzle temperature of the heating cylinder of the injection molding machine were set at 270° C. After it had been allowed to stand for one week in a room after the molding process, the molded article was inspected for the bond strength. With the aluminum plate side pressed on the desk top, the distal end of each of the boss-shaped molding 24 and the rib-shaped molding 25 was pushed strongly with a thumb in the horizontal direction, thereby attempting to separate the resin portion. However, the resin portion could not be separated even when pushed to such an extent that the finger was almost injured. This simple test was carried out on 10 molded articles. The same results were obtained for all the test samples.

Regarding a total of 70 molded articles, including the above-described 10 molded articles, the following test was carried out. The resin portion of the rib-shaped molding 25 was gripped with a pair of pliers from directly above (in such a manner that the pliers extended in the vertical direction). In this state, the rib-shaped molding 25 was attempted to separate from the aluminum plate by tilting the pliers. However, the bonded surfaces of all the 70 molded articles did not separate, but the rib-shaped moldings 25 broke at the middle. The boss-shaped molding 24 was similarly bent with a pair of pliers. The boss-shaped moldings 24 of 10 molded articles were capable of being separated from the respective aluminum plates. However, the aluminum surface from which the bonded boss-shaped molding 24 had been separated was dotted with small remnants of resin. Thus, there was material fracture at the joint surface. The boss-shaped moldings 24 of the other 60 molded articles could not be separated, but they broke at the middle.

Further, with respect to 10 other molded articles, a threaded measuring end was screwed into the hole of the boss-shaped molding 24, and a torque measuring device was turned to measure the torque at which the boss-shaped molding 24 separated. In all the molded articles, the resin wall of the hole in the boss-shaped molding 24 was shaved when the torque exceeded about 200 Ncm, resulting in a failure of the torque measuring device to engage. Accordingly, the boss-shaped molding 24 did not separate.

Further, 10 other molded articles were put on a metal pan to carry out a temperature cycle test between 85° C. and −40° C. The temperature cycle test was as follows. The molded articles were heated at a rate of +0.7° C./min from room temperature to 85° C. and allowed to stand for 2 hours. Next, the molded articles were cooled down at a rate of 0.7° C./min to room temperature (25° C. at the time of experiment) and allowed to stand for 1 hour. Thereafter, the molded articles were cooled down at the same rate to −20° C. The molded articles were allowed to stand for 2 hours at −40° C. Then, the molded articles were heated at a rate of +0.7° C./min to room temperature and allowed to stand for 1 hour before being heated again. After 100 cycles in total, the molded articles were subjected to the same test as the above using a pair of pliers and a torque measuring device. The results of the test were the same as those in the case where the temperature cycle test was not carried out.

Further, a high-temperature, high-humidity test was carried out on 10 other molded articles. More specifically, the molded articles were allowed to stand for 24 hours under the conditions of 85° C. and 60% humidity and then returned to room temperature over 1 hour. Thereafter, the molded articles were subjected to the same test as the above using a pair of pliers and a torque measuring device. The results of the test were the same as those in the case where the high-temperature, high-humidity test was not carried out. On the whole, remarkably stable results were obtained for a fracture test of bonded articles.

Such favorable results can be obtained because the aluminum alloy has been contact-treated with ammonia. It is presumed that the treatment allows the aluminum alloy surface to change to a PBT-phile surface.

(ii) Experimental Example 2

A commercially available aluminum alloy plate A5052 (Japanese Industrial Standards (JIS)) with a thickness of 1 mm was purchased. The aluminum alloy plate was cut into 50 rectangular pieces of 20 mm by 50 mm. The aluminum pieces were cleaned by the same method as in Experimental Example 1. Next, 500 g of a 1% sodium hydroxide aqueous solution was prepared in a polyethylene beaker, and the aluminum pieces were dipped therein. After 2 minutes, the aluminum pieces were pulled out of the solution and thoroughly washed with ion-exchanged water.

Next, 500 cc of an aqueous solution containing a nitric acid concentration of 1% and a hydrofluoric acid concentration of 0.2% was prepared in a polyethylene beaker, and the aluminum pieces were dipped therein for 1 minute to effect neutralization. The aluminum pieces were pulled out of the solution and thoroughly washed with ion-exchanged water. Next, 500 g of a 1% methylamine aqueous solution was prepared in a polyethylene beaker, and the aluminum pieces were dipped therein for 1 minute. The aluminum pieces were pulled out of the solution and thoroughly washed with ion-exchanged water. Further, the aluminum pieces was dipped for several seconds in acetone filled in a beaker. Thereafter, the aluminum pieces were dried with a high-pressure air blast and then put in a storage box filled with dry air. After two days, the aluminum pieces were taken out of the storage box and each inserted into an injection mold by being picked up with a gloved hand so that oil or other contaminant would not be attached thereto. Thereafter, molding process was carried out in the same way as in Experimental Example 1. With respect to 10 of the integrally molded articles thus obtained, the following test was carried out. With the aluminum plate side pressed on the desk top, the distal end of each of the boss-shaped molding 24 and the rib-shaped molding 25 was pushed strongly with a thumb in the horizontal direction, thereby attempting to separate the resin portion. However, the resin portions of all the molded articles could not be separated even when pushed to such an extent that the finger was almost injured.

Regarding a total of 50 molded articles, including the above-described 10 molded articles, the following test was carried out. The resin portion of the rib-shaped molding 25 was gripped with a pair of pliers from directly above (in such a manner that the pliers extended in the vertical direction). In this state, the rib-shaped molding 25 was attempted to separate from the aluminum plate by tilting the pliers. However, the bonded surfaces of all the 50 molded articles did not separate, but the rib-shaped moldings 25 broke at the middle. The boss-shaped molding 24 was similarly bent with a pair of pliers. The boss-shaped moldings 24 of 7 molded articles were capable of being separated from the respective aluminum plates. However, the aluminum surface from which the bonded boss-shaped molding 24 had been separated was dotted with small remnants of resin. Thus, there was material fracture at the joint surface. The boss-shaped moldings 24 of the other 43 molded articles could not be separated, but they broke at the middle.

Thus, it was confirmed that the following method can be used to allow a thermoplastic resin composition to be firmly bonded to an aluminum alloy, in which a chemical etching process or a dipping treatment in basic/acid aqueous solutions is additionally carried out before the contact treatment with an amine compound.

(iii) Experimental Example 3

Gas Contact Process

In the above-described Experimental Example 2, the aluminum pieces were neutralized with hydrofluoric acid after being treated with a sodium hydroxide aqueous solution. In Experimental Example 1, the aluminum pieces were dipped in a 28% ammonia aqueous solution after the neutralization treatment. In this example, the aluminum pieces were brought into contact with ammonia gas by the following method in place of the dipping treatment. The above-described aluminum pieces were put in a large-sized double polyethylene bag filled with 30 liters of ammonia in such a manner that the aluminum pieces would not completely be superimposed on one another. The aluminum pieces were allowed to stand in this state while a small amount of ammonia gas was being supplied into the bag.

After 48 hours, the aluminum pieces were taken out of the bag, and high-pressure air was blown thereon. Thereafter, the aluminum pieces were put in a storage box filled with dry air. Substantially the same treatment and strength test as in Experimental Example 1 were carried out except the above-described treatment. The bond strength of the products was substantially the same as in Experimental Example 1.

(iv) Experimental Example 4

A commercially available aluminum alloy plate A1100 (Japanese Industrial Standards (JIS)) with a thickness of 1 mm was purchased. The aluminum alloy plate was cut into 50 rectangular pieces of 20 mm by 50 mm. The aluminum pieces were cleaned by the same method as in Experimental Example 1. Next, 500 g of a 5% sodium sulfite aqueous solution was prepared in a polyethylene beaker, and the aluminum pieces were dipped therein. After 10 minutes, the aluminum pieces were pulled out of the solution and thoroughly washed with ion-exchanged water.

Next, 500 g of a 1% ethylene diamine aqueous solution was prepared in a polyethylene beaker, and the aluminum pieces were dipped therein for 1 minute. The aluminum pieces were pulled out of the solution and thoroughly washed with ion-exchanged water. Further, the aluminum pieces was dipped for several seconds in acetone filled in a beaker. Thereafter, the aluminum pieces were dried with a high-pressure air blast and then put in a storage box filled with dry air.

After two days, the aluminum pieces were taken out of the storage box and each inserted into an injection mold by being picked up with a gloved hand so that oil or other contaminant would not be attached thereto. Thereafter, molding process was carried out in the same way as in Experimental Example 1. With respect to 10 of the integrally molded articles thus obtained, the following test was carried out. With the aluminum plate side pressed on the desk top, the distal end of each of the boss-shaped molding 24 and the rib-shaped molding 25 was pushed strongly with a thumb in the horizontal direction, thereby attempting to separate the resin portion. However, the resin portions of all the molded articles could not be separated even when pushed to such an extent that the finger was almost injured.

Regarding a total of 50 molded articles, including the above-described 10 molded articles, the following test was carried out. The resin portion of the rib-shaped molding 25 was gripped with a pair of pliers from directly above (in such a manner that the pliers extended in the vertical direction). In this state, the rib-shaped molding 25 was attempted to separate from the aluminum plate by tilting the pliers. However, the bonded surfaces of all the 50 molded articles did not separate, but the rib-shaped moldings 25 broke at the middle. The boss-shaped molding 24 was similarly bent with a pair of pliers. The boss-shaped moldings 24 of 12 molded articles were capable of being separated from the respective aluminum plates. However, the aluminum surface from which the bonded boss-shaped molding 24 had been separated was dotted with small remnants of resin. Thus, there was material fracture at the joint surface. The boss-shaped moldings 24 of the other 38 molded articles could not be separated, but they broke at the middle.

(v) Experimental Example 5

A commercially available aluminum alloy plate A5052 (Japanese Industrial Standards (JIS)) with a thickness of 1 mm was purchased. The aluminum alloy plate was cut into 50 rectangular pieces of 20 mm by 50 mm. The aluminum pieces were cleaned by the same method as in Experimental Example 1. Next, 500 g of a 1% sodium hydroxide aqueous solution was prepared in a polyethylene beaker, and the aluminum pieces were dipped therein. After 2 minutes, the aluminum pieces were pulled out of the solution and thoroughly washed with ion-exchanged water.

Next, 500 cc of 1% nitric acid was prepared in a polyethylene beaker, and the aluminum pieces were dipped therein for 1 minute to effect neutralization. The aluminum pieces were pulled out of the solution and thoroughly washed with ion-exchanged water. Next, 500 g of a 5% hydrated hydrazine aqueous solution was prepared in a polyethylene beaker and heated to 50° C. The aluminum pieces were dipped therein for 2 minutes. Then, the aluminum pieces were pulled out of the solution and thoroughly washed with ion-exchanged water.

Further, the aluminum pieces was transferred to a hot-air drier and dried for 20 minutes at 70° C. Then, the aluminum pieces were put in a storage box filled with dry air. After two days, the aluminum pieces were taken out of the storage box and each inserted into an injection mold by being picked up with a gloved hand so that oil or other contaminant would not be attached thereto. Thereafter, molding process was carried out in the same way as in Experimental Example 1. With respect to 10 of the integrally molded articles thus obtained, the following test was carried out. With the aluminum plate side pressed on the desk top, the distal end of each of the boss-shaped molding 24 and the rib-shaped molding 25 was pushed strongly with a thumb in the horizontal direction, thereby attempting to separate the resin portion. However, the resin portions of all the molded articles could not be separated even when pushed to such an extent that the finger was almost injured.

Regarding a total of 50 molded articles, including the above-described 10 molded articles, the following test was carried out. The resin portion of the rib-shaped molding 25 was gripped with a pair of pliers from directly above (in such a manner that the pliers extended in the vertical direction). In this state, the rib-shaped molding 25 was attempted to separate from the aluminum plate by tilting the pliers. However, the bonded surfaces of all the 50 molded articles did not separate, but the rib-shaped moldings 25 broke at the middle. The boss-shaped molding 24 was similarly bent with a pair of pliers. The boss-shaped moldings 24 of 7 molded articles were capable of being separated from the respective aluminum plates. However, the aluminum surface from which the bonded boss-shaped molding 24 had been separated was dotted with small remnants of resin. Thus, there was material fracture at the joint surface. The boss-shaped moldings 24 of the other 43 molded articles could not be separated, but they broke at the middle.

FIELD OF INDUSTRIAL APPLICATION

The present invention is applicable in the fields of various electronic devices for mobile applications, domestic electrification products, medical devices, automotive bodies, vehicle-mounted products, construction material parts, structural parts of various other machines, various parts for interior and exterior applications, and so forth.

What is claimed is:

1. A method for producing a composite of an aluminum alloy and a thermoplastic resin, comprising:
   providing a shaped aluminum alloy material having a surface;
   treating the surface with an aqueous solution comprising a compound selected from the group consisting of ammonia, hydrazine, a hydrazine derivative, and a water soluble amine compound, in a concentration of 2 to 30%, and at a dipping time of from several minutes to 30 minutes at a temperature in the range of room temperature to 60° C.; and
   molding a thermoplastic resin directly on the treated surface of the shaped aluminum alloy by injection molding, wherein the thermoplastic resin is made of one selected from the group consisting of a polyalkylene terephthalate, a copolymer consisting essentially of a polyalkylene terephthalate, and a thermoplastic resin composition containing a polyalkylene terephthalate as a component.

2. The method according to claim 1, wherein said thermoplastic resin is polybutylene terephthalate.

3. The method according to claim 2, wherein said polybutylene terephthalate is selected from the group consisting of polybutylene terephthalate, a polymer compound of polybutylene terephthalate and polycarbonate, a polymer compound of polybutylene terephthalate and acrylonitrile-butadiene-styrene resin, a polymer compound of polybutylene terephthalate and polyethylene terephthalate, and a polymer compound of polybutylene terephthalate and polystyrene.

4. The method according to claim 1, further comprising:
   dipping said shaped aluminum alloy material in a basic aqueous solution, before treating the surface.

5. The method according to claim 4, wherein said basic aqueous solution is an aqueous solution of an alkali metal hydroxide.

6. The method according to claim 4, further comprising:
   neutralizing said dipped shaped aluminum alloy material in an acid aqueous solution.

7. The method according to claim 6, wherein said thermoplastic polymer includes a high-strength fiber.

8. The method according to claim 7, wherein said high-strength fiber comprises at least one selected from the group consisting of glass fiber, carbon fiber, and aramid fiber.

9. The method according claim 1, further comprising dipping said shaped aluminum alloy material in an aqueous solution of a water-soluble reducing agent.

10. The method according to claim 1, wherein the compound is ammonia.

11. The method according to claim 1, wherein the compound is hydrazine.

12. The method according to claim 1, wherein the compound is a water-soluble amine compound.

13. The method according to claim 12, wherein the water-soluble amine compound is selected from the group consisting of methylamine, dimethylamine, trimethylamine, ethylamine, diethylamine, triethylamine, ethylene diamine, ethanol amine, mono-ethanol amine, aryl amine, and diethanol amine.

14. The method according to claim 1, wherein the temperature of treating the surface with an aqueous solution is in the range of from 25 to 60 C.

15. A method for producing a composite of an aluminum alloy and a thermoplastic resin, comprising:

providing a shaped aluminum alloy material having a surface;

treating the surface with an aqueous solution comprising a compound selected from the group consisting of ammonia, hydrazine, a hydrazine derivative, and a water soluble amine compound, in a concentration of 2 to 30%, and at a temperature in the range of room temperature to 60 C; and molding a thermoplastic resin directly on the treated surface of the shaped aluminum alloy by injection molding, wherein the thermoplastic resin is made of one selected from the group consisting of a polyalkylene terephthalate, a copolymer consisting essentially of a polyalkylene terephthalate, and a thermoplastic resin composition containing a polyalkylene terephthalate as a component.

* * * * *